United States Patent
Hagiwara et al.

(10) Patent No.: US 6,630,523 B2
(45) Date of Patent: Oct. 7, 2003

(54) METHOD FOR PRODUCING RESIN COMPOSITION USED FOR PAINT

(75) Inventors: Koichi Hagiwara, Aichi-ken (JP); Hirotaka Kanato, Aichi-ken (JP); Takaharu Bessho, Aichi-ken (JP)

(73) Assignee: Nippon Paint Co., Ltd., Ohsaka (JP)

( * ) Notice: Subject to any disclaimer, the term of this patent is extended or adjusted under 35 U.S.C. 154(b) by 0 days.

(21) Appl. No.: 10/095,207

(22) Filed: Mar. 11, 2002

(65) Prior Publication Data

US 2002/0193485 A1 Dec. 19, 2002

(30) Foreign Application Priority Data

Mar. 28, 2001 (JP) .......................................... 2001-094133

(51) Int. Cl.$^7$ .............................. C08R 3/10; C08L 63/02
(52) U.S. Cl. .................... 523/457; 204/489; 204/499; 524/405; 524/407; 524/413; 524/434; 524/435
(58) Field of Search ................................ 523/457, 458, 523/459; 524/405, 407, 413, 434, 435; 204/489, 499

(56) References Cited

U.S. PATENT DOCUMENTS 4,210,572 A * 7/1980 Herman

FOREIGN PATENT DOCUMENTS

JP 63-186773 8/1988

OTHER PUBLICATIONS

Patton, Temple C., "Paint flow and pigment dispersion: a rheological approach to coating and ink technology (2nd ed.)" New York: John Wiley and Sons, 1979, pp. 433–435.

* cited by examiner

*Primary Examiner*—Robert Dawson
*Assistant Examiner*—D. Aylward
(74) *Attorney, Agent, or Firm*—Fay, Sharpe, Fagan, Minnich & McKee, LLP

(57) ABSTRACT

This invention is intended to provide a method for producing a resin composition used for paint which is preferable for improving dispersibility of pigments, thereby improving productivity. The method is characterized in that a plurality of pigments which consist a resin composition used for paint is mixed, the mixed pigments are dispersed at an optimal dispersion mixing ratio with a resin and a solvent, which has been found in advance using a Daniel Flow Point Method (a Flow Point Method), and then other components are added thereto to obtain the predetermined resin composition used for paint. It is particularly preferable for the resin composition used for paint to be an electrodeposition paint composition.

12 Claims, 1 Drawing Sheet

F I G. 1
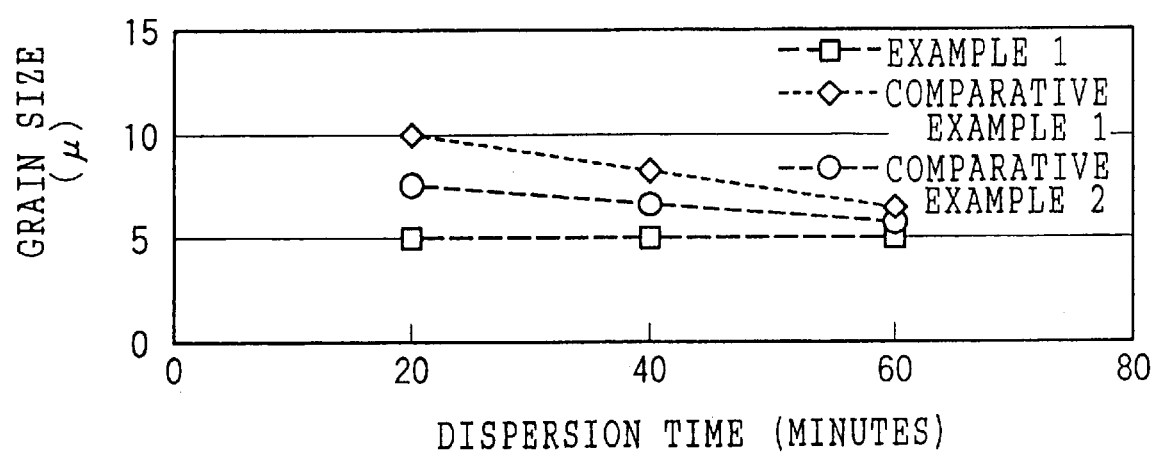

METHOD FOR PRODUCING RESIN COMPOSITION USED FOR PAINT

BACKGROUND OF THE INVENTION

1. Field of the Invention

The present invention relates to a method for producing a resin composition used for paint. More particularly, the present invention relates to a method for producing a resin composition used for paint which is preferable for improving dispersibility of pigments, thereby improving productivity.

2. Description of the Related Art

Conventionally, paint resin compositions usually include coloring materials such as particular inorganic pigments, organic pigments, or the like, depending on their application. In case of dispersing pigments in a resin composition used for paint, if the dispersibility of the pigments is not sufficient, a paint film obtained is not a good one, and various problems easily occur during coating processes. Further, a deterioration of the quality of the film could be caused.

Especially, in a case of an electrodeposition paint, low dispersibility of pigments easily cause a sedimentation of the pigments in the resin composition used for paint. In order to suppress the sedimentation, an electrodeposition paint bath is provided with a stirrer to keep the electrodeposition paint flow. However, sedimentation of the pigments cannot be completely prevented. During electrodeposition, a part of the settled pigment is deposited on horizontal areas of a material being painted, and this leads to a degradation of an appearance of the paint film in these areas. For example, in cases of a body of an automobile, an outdoor unit of an air conditioner, and the like, more pigments may be deposited on upper surface of horizontal surfaces than on other areas of a material being painted in a electrodeposition bath, and this causes problems in evenness, smoothness and sharpness of the paint film.

An approach to improve dispersibility of pigments in a resin composition used for paint includes changing a composition of the resin composition, such as changing a resin used in the dispersion, and the like. However, changing the composition of the resin composition used for paint itself requires a new confirmation over the long term of properties of the resin composition used for paint.

SUMMARY OF THE INVENTION

An object of the present invention is to provide a method for producing a resin composition used for paint which improves the dispersibility of pigments, thereby improving productivity and paint film properties of the resin composition for paint, without changing the composition thereof.

The above-described object of the present invention is accomplished by the following invention.

Namely, a first aspect of the present invention is a method for producing a resin composition used for paint, wherein plural pigments, which compose a resin composition used for paint, is dispersed at an optimal dispersion mixing ratio with resins and solvents, which has been found in advance using Daniel Flow Point Method, and then other components are added thereto to form the predetermined resin composition used for paint.

A second aspect of the present invention is a method for producing a resin composition used for paint wherein the resin composition used for paint is an electrodeposition paint composition.

BRIEF DESCRIPTION OF THE DRAWINGS

FIG. 1 is a graph showing a comparison of dispersion speeds of pigments in Example 1 and Comparative Examples 1 and 2.

DESCRIPTION OF THE PREFERRED EMBODIMENTS

Hereinafter, a preferred embodiment of the present invention is described.

The present invention is characterized in that pigments which compose a resin composition used for paint are mixed, the pigment mixture is dispersed at an optimal dispersion mixing ratio with resins and solvents, which has been found in advance using a Daniel Flow Point Method (also called Flow Point Method), and then other components are added thereto to obtain a predetermined resin composition used for paint.

In the present invention, the objective resin composition used for paint is not particularly limited and also can be preferably used in an electrodeposition paint composition. In general, a resin composition used for paint includes color pigments, extender pigments, anticorrosive pigments, and the like. These pigments composing the resin composition used for paint are mixed, and the resulting pigment mixture is mixed with resins and solvents at an optimal dispersion mixing ratio, which has been obtained in advance using the Daniel Flow Point Method.

The "Daniel Flow Point Method" is described, for example, in "Paint Flow and Pigment Dispersion", written by T. C. Patton, 1971. In this method, first, several types of mixed solutions (hereinafter referred to as vehicle) which contain the solvent and the resin in different ratios, are prepared. Then, one of the vehicles is added into a 100 ml beaker containing a particular amount of the pigment with stirring with a glass rod, and an amount of the vehicle at a point at which the "flow point" is reached is measured. The same measurements are carried out similarly using other vehicles having different solvent to resin ratios.

Using the results thus obtained, a flow point curve is drawn with amounts of the solid components of the resin in the vehicles on an abscissa and the amounts of the vehicles required to reach the flow points on an ordinate. The flow point curve is U-shaped and has a minimum value. A composition at the minimum value is one in which the resin, the solvent and the pigment are well balanced and can be dispersed most efficiently.

Determining the above-described flow point requires some experience, but the outline thereof is as follows. When, as described above, the pigments in the beaker are kneaded while the vehicle is added thereto, the content of the beaker is paste-like at first, however, as more of the vehicle is added and mixed in, the drag that one stirring the content feels becomes very small. At this time, the glass rod is lifted straight above the beaker. If the liquid adhering to the glass rod remains as a thin film, the last few drops of the liquid fall at intervals of 1 to 2 seconds, and the liquid has a sticky feel, this point is the flow point.

The Daniel Flow Point Method described in the above mentioned reference is a method for obtaining an optimal composition for a mill base using one type of pigment ($TiO_2$ in the above reference). It is also disclosed that when at least two types of pigments are included, the optimal composition can be determined by finding the amount of the vehicle when each pigment has reached its respective flow point, and proportionally adding these amounts of vehicle, in accordance with the ratio of the combined pigments.

However, the method for producing a resin composition used for paint of the present invention produces a resin composition used for paint which includes at least two types of pigments, wherein a mixture of two or more pigments is mixed with resins and solvents at an optimal dispersion mixing ratio which has been obtained in advance using the Daniel Flow Point Method.

In the resin composition used for paint obtained by the production method of the present invention, a particle size of the pigments can be micrified to a predetermined value (e.g., 5 μm) in a shorter time than finding an optimal dispersion mixing ratio with a resin and a solvent for each pigment, thereby improving dispersibility of the pigments.

Particularly, in case of electro-deposition, an appearance of horizontal aspects tends to be worse than that of vertical aspects. This is because a paint used in electrodeposition includes pigments which have a large specific gravities, while the electrodeposition paint uses water which has specific gravity of 1 as a solvent, and viscosity of the resin composition used for paint is nearly as low as water. In an electrodeposition paint, which forms a film after (or while) a material to be coated is dipped in the electrodeposition paint, the paint is deposited under mild stirring conditions. Therefore, the pigments tend to accumulate on the horizontal aspects of the material to be coated (such as a body of an automobile). In general, when the pigments accumulate, so-called lump-like protrusions are easily formed at those portions, and the abnormal depositions are observed as so-called lumps after baking.

Since dispersibility of the pigment can be improved in a short time in the method for producing a resin composition used for paint of the present invention, productivity of the resin composition used for paint on a production line can be improved, sedimentation speed of the pigments in the electrodeposition paint can be delayed, and formation of the above-described lumps can be prevented.

In the present invention, the method for producing a resin composition used for paint comprises at least a "dispersing step" and a "dissolving step".

In the "dispersing step", pigments which form the resin composition used for paint are mixed, and the pigment mixture is dispersed at an optimal dispersion mixture ratio with resins and solvents, which has been obtained in advance using the Daniel Flow Point Method. In this case, the pigments to be mixed include color pigments such as titanium white, carbon black and red oxide; and extender pigments such as kaolin, talc, calcium carbonate, clay and silica; anticorrosive pigments such as chrome pigments (such as strontium chromate, zinc chromate), lead pigments (such as basic lead silicate, basic lead chromate, red lead, lead cyanamide), phosphate pigments (such as aluminum phosphate, zinc phosphate, calcium phosphate), molybdate pigments (such as aluminum phosphomolybdate, zinc phosphomolybdate, and the like), borate pigments (such as barium metaborate, and the like) and cerium pigments (such as cerium carbonate, cerium acetate, cerium pyrophosphate, and the like); and mixtures of two or more of these pigments.

Examples of the resin for dispersing pigments which can be used for the electrodeposition paint include typical cationic electrodeposition paints such as sulfonium salt type epoxy resin, quaternary ammonium salt type epoxy resin, tertiary amine type epoxy resin, quaternary ammonium salt type acrylic resin, and the like.

As the solvent, one or more solvents can be suitably selected depending on the type of the resin for dispersing pigments to be used. Specifically, water is mainly used as the solvent, but water containing a small amount of an organic solvent such as butyl cellosolve, dipropylene glycol monobutylether, or the like, can also be used.

In the "dispersing step", besides the pigments, the resin for dispersing pigments and the resin, a wetting agent, a surfactant, a defoaming agent, and the like, can also be added to the resulting pigment dispersion paste as necessary. As the surfactant or the wetting agent, alkyl imidazoline, acetylene alcohol, or the like, can be used. Further, a plasticizer may be added to the pigment paste. Examples of the plasticizer include high-boiling-point water-miscible materials such as nonylphenol, as well as ethylene oxide adduct and propylene oxide adduct of bisphenol A.

In the "dissolving step", other components are further added. The other components here are those optionally selected depending on the application of the resin composition used for paint, and examples thereof in the case of the electrodeposition paint include the resin for dispersing pigments, the solvent, and the like.

As a substrate resin, a hydrophilic film-forming resin having a cationic group can be used, which is derived from a bisphenol type epoxy resin, and has a number average molecular weight of 100 to 10,000, and preferably 1,000 to 3,000. A base equivalent weight of the substrate resin may be in a normal range, and specifically in a range from 40 to 150 (milliequivalent/100 g), preferably from 60 to 100 (milliequivalent/100 g). A specific example thereof is an oxazolidone ring modified epoxy resin such as that which has been proposed by the applicant of the present invention and is disclosed in Japanese Patent Application Laid-Open (JP-A) No. 5-306327. The oxazolidone ring modified epoxy resin is obtained by a dealcoholization reaction between an epoxy resin and either a bisurethane compound, which is formed by reacting a diisocyanate compound, or a heterourethane compound, which is formed by reacting another active hydrogen compound.

As a curing agent, blocked polyisocyanate compounds are used. The blocked isocyanate curing agent can be obtained by an addition reaction between a polyfunctional isocyanate compound and an isocyanate blocking agent. The polyfunctional isocyanate compounds to be used are an aliphatic, alicyclic or aromatic polyisocyanate. Examples thereof include tolylenediisocyanate, xylylenediisocyanate, 4,4'-diphenylmethanediisocyanate, hexamethylenediisocyanate, isophoronediisocyanate and isocyanurates thereof. The isocyanate blocking agent is desirably one which generates by an addition reaction a block isocyanate compound which is stable at ordinary temperatures and whose block can be dissociated to regenerate free isocyanate groups when heated to 100–200° C. Examples thereof include lactam compounds such as ε-caprolactam, γ-butylolactam, and the like; phenol compounds such as phenol, cresol, xylenol, and the like; alcoholic compounds such as methanol, ethanol, furfuryl alcohol, butyl cellosolve, and the like; oxime compounds such as methyl ethyl ketone oxime, cyclohexanone oxime, and the like.

As a curing catalyst, a tin compound such as dibutyltin oxide, dibutyltin dilaurate, or the like, can be used.

The amount of the above-described block isocyanate curing agent to be added is preferably determined in terms of a ratio of the substrate resin and the curing agent. Usually, a mass ratio of solid components of the substrate resin and the curing agent is set to be from 90/10 to 50/50. If the ratio of the curing agent is too small, it is impossible to obtain a sufficient curing property, and if it is too large, a baking weight loss would be increased.

A resin emulsion can be obtained by dispersing the substrate resin and the curing agent into an aqueous medium which contains as a neutralizer a water-soluble organic acid such as formic acid, acetic acid, propionic acid, lactic acid, citric acid, malic acid, tartaric acid, acrylic acid, or the like, or an inorganic acid such as hydrochloric acid, phosphoric acid, or the like.

The cathode electrodeposition paint composition of the present invention can be coated on a surface of a desired substrate by cationic electrodeposition. The cationic electrodeposition can be carried out according to a known method, using an electrodeposition bath containing the cathode electrodeposition paint composition of the present invention which is diluted with deionized water to have a solid concentration of generally 5 to 40% by mass and preferably 15 to 25% by mass and whose pH is adjusted to a range from 5.5 to 8.5, and under conditions of a bath temperature of 20 to 35° C. and a load voltage of 100 to 450V.

A film thickness of the electrodeposition coating which can be formed using the cathode electrodeposition paint composition of the present invention is not particularly limited. Generally, however, a range from 5 to 60 μm, and preferably from 10 to 40 μm in a cured state is suitable. Further, a suitable baking temperature for the coated film is within a range generally from 100 to 200° C., and preferably from 150 to 180° C.; a suitable baking time ranges from 10 to 30 minutes.

EXAMPLES

Hereinafter, examples of the present invention are described, however, these examples are not intended to limit the present invention.

Example 1
(Synthesis of Substrate Resin with Oxazolidone Ring)

A flask equipped with a stirrer, a cooler, a nitrogen injecting tube, a thermometer and a dropping funnel was prepared. Into the flask, 92 g of 2,4-/2,6-tolylenediisocyanate (mass ratio=8/2), 95 g of methyl isobutyl ketone and 0.5 g of dibutyltin dilaurate were added, and 21 g of methanol was dropped therein while the mixture was being stirred. A reaction was started at room temperature, and the temperature was raised to 60° C. by heat generation. After continuing the reaction for 30 minutes, 57 g of ethylene glycol mono-2-ethylhexylether was dropped from the dropping funnel, and 42 g of bisphenol A-propylene oxide 5 mole adduct was added. The reaction was carried out at a temperature ranging mainly from 60 to 65° C., and was continued until the isocyanate group disappeared according to a measurement of an IR spectrum. Then, 365 g of epoxy resin having an epoxy equivalent of 188, which was synthesized from bisphenol A and epichlorohydrine, was added and the temperature was raised to 125° C. Thereafter, 1.0 g of benzyldimethylamine was added, and the mixture was reacted at 130° C. until the epoxy equivalent reached 410. Subsequently, 87 g of bisphenol A was added into the reaction container and after the mixture was reacted at 120° C., an epoxy equivalent reached 1190. Thereafter, the reactant was cooled, and 11 g of diethanolamine, 24 g of N-methylethanolamine and 25 g of ketimine of aminoethylethanolamine (79% by mass methyl isobutyl ketone solution) were added, and the mixture was reacted at 110° C. for two hours. Then, the reactant was diluted with methyl isobutyl ketone until nonvolatile matter thereof reached 80% to obtain a substrate resin having an oxazolidone ring.
(Synthesis of a Blocked Isocyanate)

A flask equipped with a stirrer, a cooler, a nitrogen injecting tube, a thermometer and a dropping funnel was prepared. Into the flask, 199 g of trimer of hexamethylene diisocyanate (COLONATE HX, manufactured by Nippon Polyurethane Industry Co., Ltd.) and 11.3 g of ε-caprolactam were added. A temperature of the content of the flask was raised to 80° C. to dissolve it homogeneously. At this point, 32 g of methyl isobutyl ketone, 0.05 g of dibutyltin dilaurate and 0.05 g of 1,8-diazabicyclo(5,4,0)-7-undecene were added. While the mixture was stirred and nitrogen was bubbled into the mixture, 78.3 g of methyl ethyl ketoxime was dropped from the dropping funnel for one hour with care being taken about heat generation. The reaction was continued until isocyanate groups disappeared, which was indicated by the IR spectrum, to obtain a blocked isocyanate cross linking agent. 350 g (solid) of the above substrate resin and 150 g (solid) of the above cross linking agent were mixed, and ethylene glycol mono-2-ethylhexylether (the amount of which was 3% of solid components, i.e., 15 g) was added thereto. Subsequently, the mixture was neutralized by adding glacial acetic acid so that the neutralization rate reached 40.5%, and then was diluted slowly with ion exchanged water. Then, methyl isobutyl ketone was removed under reduced pressure so that the amount of solid components became 36.0%, to obtain a resin emulsion.
(Preparation of a Pigment Dispersing Resin)

A flask equipped with a stirrer, a cooler, a nitrogen injecting tube, a thermometer and a dropping funnel was prepared. Into the flask, 222.0 g of isophorone diisocyanate was added, and was diluted with 39.1 g of methyl isobutyl ketone, and then, 0.2 g of dibutyltin dilaurate was added thereto. After the temperature was raised to 50° C., 131.5 g of 2-ethylhexanol was dropped from the dropping funnel for two hours while the mixture was stirred and nitrogen was bubbled into the mixture. The reaction temperature at this time was kept at 50° C. by suitable cooling. As a result, 2-ethylhexanol half-blocked isophorone diisocyanate was obtained (90% solid components).

Another flask equipped with a stirrer, a cooler, a nitrogen injecting tube, a thermometer and a dropping funnel was prepared. Into the flask, 376.0 g of EPON 828 (an epoxy resin manufactured by Shell Chemicals Ltd.) and 114.0 g of bisphenol A were added, and were heated at 130° C. in a nitrogen atmosphere. Then, 0.75 g of dimethylbenzylamine was added thereto, and the mixture was reacted for one hour at exothermic reaction of 170° C. to obtain a bisphenol A type epoxy resin having an epoxy equivalent of 490. After it was cooled to 140° C., 198.4 g of the above 2-ethylhexanol half-blocked isophorone diisocyanate was added thereto, and was reacted with the temperature being maintained at 140° C. for one hour. Then, 161.8 g of ethylene glycol monobutyl ether was added thereto, and the reaction mixture was cooled to 100° C. Into the reaction mixture, 366.0 g of thiodiethanol, 134.0 g of dimethylol propionic acid and 144.0 g of deionized water were added and were reacted at 70 to 75° C. until an acid value of 0.241 was reached. Then, the reactant was diluted with 353.3 g of ethylene glycol monobutyl ether, to obtain a pigment dispersion resin having a sulfonium percentage of 82% (50% solid components).
(Measurement of Flow Points by Daniel Flow Point Method)

This measurement is carried out using the above pigment dispersion resin, deionized water as a solvent, and a pigment mixture including carbon black, kaolin and titanium dioxide (mass ratio of the pigments=1.3:53.0:45.7) by the Daniel Flow Point Method. First, six types of mixture liquids containing respectively 3, 5, 10, 15, 20 and 25% by mass of the pigment dispersion resin diluted with deionized water were prepared. Then, while being stirred with a glass rod, the mixture liquids were respectively added into six beakers each containing 20 g of the above pigment mixture, and a flow point was found for each mixture. Using the six obtained flow points, a curve representing mass of the vehicle required to reach the flow point with respect to the amount of the solid components of the resin was drawn, and the minimum value on the curve, i.e., an optimal mixing ratio was found (in this Example, solvent such as deionized water: solid components of the pigment dispersion resin: pigment mixture=57.8:10.2:100 (mass ratio), that is, deionized water: pigment dispersion resin: pigment mixture= 47.6:20.4:100 (mass ratio)).

(Dispersing Step for Preparing a Pigment Dispersion Paste)

Using the optimal mixing ratio above, 204 g of the pigment dispersion resin, 476 g of deionized water and 1,000 g of the pigment mixture were set into a sand-grind mill, and dispersion was carried out at 45° C. for 20 minutes to obtain a pigment dispersion paste having a pigment particle size of 5 $\mu$m. The particle size was measured with a grind gauge.

Then, by adding 296 g of the pigment dispersion resin and 475 g of deionized water, a final pigment dispersion paste with solid components being 51% by mass and a mass ratio of pigment mixture: solid components of the pigment dispersion resin=1:0.25 was obtained.

(Preparation of an Electrodeposition Paint)

381.9 parts by mass of the resin emulsion prepared above, 122.5 parts by mass of the pigment dispersion paste prepared above, and 495.6 parts by mass of ion exchanged water were mixed to prepare a cationic electrodeposition paint composition containing 20.0% by mass solid components. A solid ratio of the mass of all of the pigment and all of the resin contained in the cationic electrodeposition paint composition was 1/3.

Comparative Example 1

500 g of the pigment dispersion resin, 951 g of deionized water, which is a solvent, and 1,000 g of a pigment mixture including carbon black, kaolin and titanium dioxide (mass ratio of the pigments=1.3:53.0:45.7) were set into a sand-grind mill without using the Daniel Flow Point Method, and dispersion was carried out at 45° C. for 20 minutes to obtain a final pigment dispersion paste having a grain size of 10 $\mu$m (solid components was 51% by mass and mass ratio of pigment mixture: solid components of the pigment dispersion resin=1:0.25).

(Preparation of an Electrodeposition Paint)

An electrodeposition paint was prepared in the same manner as in Example 1.

Comparative Example 2

(Measurement of Flow Point by the Daniel Flow Point Method)

This measurement was carried out using the above pigment dispersion resin, deionized water as a solvent, and carbon black by the Daniel Flow Point Method. First, six types of mixture liquids containing respectively 3, 5, 10, 15, 20 and 25% by mass (solid components) of the pigment dispersion resin diluted with deionized water were prepared. Then, while being stirred with a glass rod, the mixture liquids were respectively added into six beakers each containing 20 g of carbon black, and a flow point was found for each. Using the six flow points thus obtained, a curve representing a mass of the vehicle required to reach the flow point with respect to each amount of the solid components of the resin was drawn, and the minimum value on the curve, i.e., an optimal mixing ratio was found (in this Comparative Example, solvent (such as deionized water): solid components of the resin: carbon black=195.4:21.8:100 (mass ratio)).

An optimal mixing ratio for the case using kaolin and for using titanium dioxide were respectively found, and they were as follows:

solvent (such as deionized water): solid components of the resin: kaolin=67.6:11.9:100 (mass ratio); and solvent (such as deionized water): solid components of the resin: titanium dioxide=39.4:2.1:100 (mass ratio).

(Dispersing Step for Preparing a Pigment Dispersion Paste)

151 g of the pigment dispersion resin, 488 g of deionized water and 1,000 g of the pigment mixture (the amounts thereof in a mixing ratio which was obtained by proportionally distributing, on the basis of the composition of the pigment mixture, the optimal mixing ratios respectively found for the above pigments) were set in a sand-grind mill, and dispersion was carried out at 45° C. for 20 minutes to obtain a pigment dispersion paste having a pigment particle size of 8 $\mu$m.

Then, by adding 349 g of the pigment dispersion resin and 463 g of deionized water, a final pigment dispersion paste with solid components being 51% by mass and a mass ratio of pigment mixture solid components of the pigment dispersion resin=1:0.25 was obtained.

(Preparation of an Electrodeposition Paint)

An electrodeposition paint was prepared in the same manner as in Example 1.

FIG. 1 shows a relationship between a dispersion time and particle size of the pigments in the pigment paste dispersion step for each of the resin composition used for paints obtained in Example 1, and Comparative Examples 1 and 2. As can be seen from FIG. 1, in the resin composition used for paint of Example 1, the particle size of the pigments in the pigment dispersion paste reached 5 $\mu$m in 20 minutes of dispersing step, and therefore dispersion speed thereof was found to be fast.

In the resin composition used for paint of Comparative Example 1, the particle size of the pigments in the pigment dispersion paste was still as large as 10 $\mu$m 20 minutes after the start of the dispersing step, and was about 6 $\mu$m after 60 minutes. Further, in the resin composition used for paint of Comparative Example 2, the particle size of the pigments in the pigment dispersion paste was still as large as 8 $\mu$m 20 minutes after the start of the dispersing step, and was about 5 to 6 $\mu$m after 60 minutes. Therefore, the dispersion speed of the pigments in Example 1 is faster than those in Comparative Examples 1 and 2.

Evaluation Method

[Appearance of Horizontal Aspects (Method C, 5 Minutes)]

(1) A cold rolled steel plate (70×150×0.8 mm), which had been surface-treated with SURFDAIN SD5000 (manufactured by Nippon Paint Co., Ltd.), was prepared.

(2) 4 liters of paint was poured into a rectangular container made of vinyl chloride, and was stirred with a magnetic stirrer at a rotation speed of 600 rpm.

(3) The test plate of the above (1) was set in the paint liquid and the rotation speed of the magnetic stirrer was reduced to 300 rpm. These conditions were maintained for 5 minutes.

(4) Electrodeposition was carried out with the rotational speed being maintained at 300 rpm, using a flat stainless steel plate (70×150×0.8 mm) as an anode, to form a paint film having a thickness of 15 $\mu$m when cured.

(5) The paint film was cured at 160° C. for 10 minutes, and conditions of the paint film at a horizontal top surface were evaluated according to the following criteria.

[Lumps]
- ○: No creation of lumps
- Δ: Some lumps created
- ×: Many lumps created The results of the evaluation are shown in Table 1.

TABLE 1

Results of Horizontal Method C Test

| | Evaluation |
|---|---|
| Example 1 | ○ |
| Comparative Example 1 | X |
| Comparative Example 2 | Δ |

As can be seen from Table 1, the resin composition used for paint of Example 1, which was obtained by mixing the pigments, dispersing the pigment mixture at the optimal dispersion mixing ratio with the resin and the solvent which had been found in advance using the Daniel Flow Point Method, milling the dispersant with a sand mill, preparing the pigment mixture to obtain the pigment dispersion paste, and then adding other components, had no lump creation and was better than the resin composition used for paint of Comparative Example 1, which was prepared without using the Daniel Flow Point Method, and that of Comparative Example 2, which was prepared by finding the Daniel Flow Point for each of the components and proportionally adding the amounts of vehicles on the basis of the composition of the pigment mixture.

As described above, according to the present invention, the method for producing a resin composition used for paint can be provided which allows improvement in dispersibility of pigments in a resin composition used for paint without changing the composition itself, thereby improving productivity and paint film properties.

What is claimed is:

1. A method for producing a resin composition used for paint, the method comprising the steps of:
   mixing pigments;
   dispersing the mixed pigments with a resin for dispersing the pigments and a solvent at an optimal dispersion mixing ratio, which has been predetermined by a Daniel Flow Point Method; and thereafter
   adding components to obtain the predetermined resin composition used for paint.

2. The method for producing a resin composition used for paint according to claim 1, further comprising the steps of:
   producing the mixed pigments by mixing the pigments;
   producing a pigment dispersion paste by dispersing the pigment mixture with the resin for dispersing pigments and the solvent at the optimal dispersion mixing ratio, which has been predetermined using the Daniel Flow Point Method;
   producing a final pigment dispersion paste by adding the resin for dispersing the pigments and the solvent to the pigment dispersion paste; and
   adding other components, which are required to obtain the predetermined resin composition used for paint, to the final pigment dispersion paste.

3. The method for producing a resin composition used for paint according to claim 2, wherein the pigments comprise a plurality of pigments which are selected from a group consisting of color pigments, extender pigments and anticorrosive pigments.

4. The method for producing a resin composition used for paint according to claim 3, wherein the anticorrosive pigments are selected from a group consisting of chrome pigments, lead pigments, phosphate pigments, molybdate pigments, borate pigments and cerium pigments.

5. The method for producing a resin composition used for paint according to claim 2, wherein the resin for dispersing pigments is selected from a group consisting of sulfonium salt type epoxy resins, quaternary ammonium salt type epoxy resins, tertiary amine type epoxy resins and quaternary ammonium salt type acrylic resins.

6. The method for producing a resin composition used for paint according to claim 2, wherein the solvent mainly comprises water.

7. The method for producing a resin composition used for paint according to claim 2, wherein the solvent comprises a small amount of organic solvent.

8. The method for producing a resin composition used for paint according to claim 2, wherein the other components, which are required to form the predetermined resin composition used for paint, comprise a substrate resin.

9. The method for producing a resin composition used for paint according to claim 2, wherein the other components, which are required to form the predetermined resin composition used for paint, comprise a resin emulsion.

10. The method for producing a resin composition used for paint according to claim 1, wherein the resin composition used for paint is an electrodeposition paint composition.

11. The method for producing a resin composition used for paint according to claim 2, wherein the resin composition used for paint is an electrodeposition paint composition.

12. A resin composition used for paint produced by a method for producing the resin composition used for paint, the method comprising the steps of:
    preparing a pigment mixture by mixing pigments which compose the resin composition used for paint;
    preparing a pigment dispersion paste by dispersing the pigment mixture at an optimal dispersion mixing ratio with a resin for dispersing pigments and a solvent, which has been found in advance using a Daniel Flow Point Method;
    preparing a final pigment dispersion paste by adding the resin for dispersing pigments and the solvent to the pigment dispersion paste; and
    adding other components, which are required to form the predetermined resin composition used for paint, to the final pigment dispersion paste.

* * * * *